2,513,538

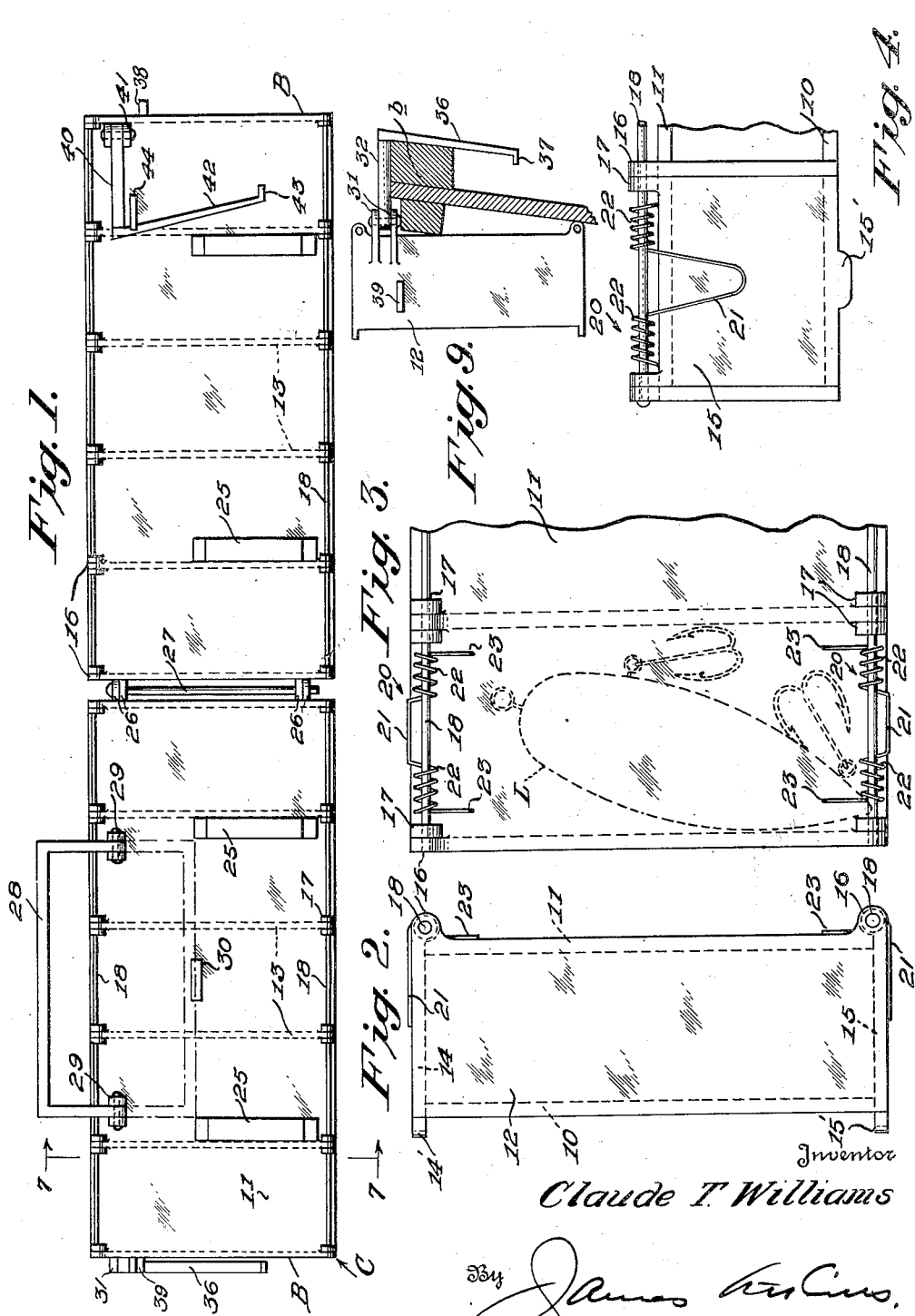
July 4, 1950     C. T. WILLIAMS     2,513,538
CARRIER FOR BAIT-CASTING PLUGS AND LURES
Filed Dec. 6, 1946     2 Sheets-Sheet 1
Inventor
Claude T. Williams
By
Attorney July 4, 1950 — C. T. WILLIAMS — 2,513,538
CARRIER FOR BAIT-CASTING PLUGS AND LURES
Filed Dec. 6, 1946 — 2 Sheets-Sheet 2
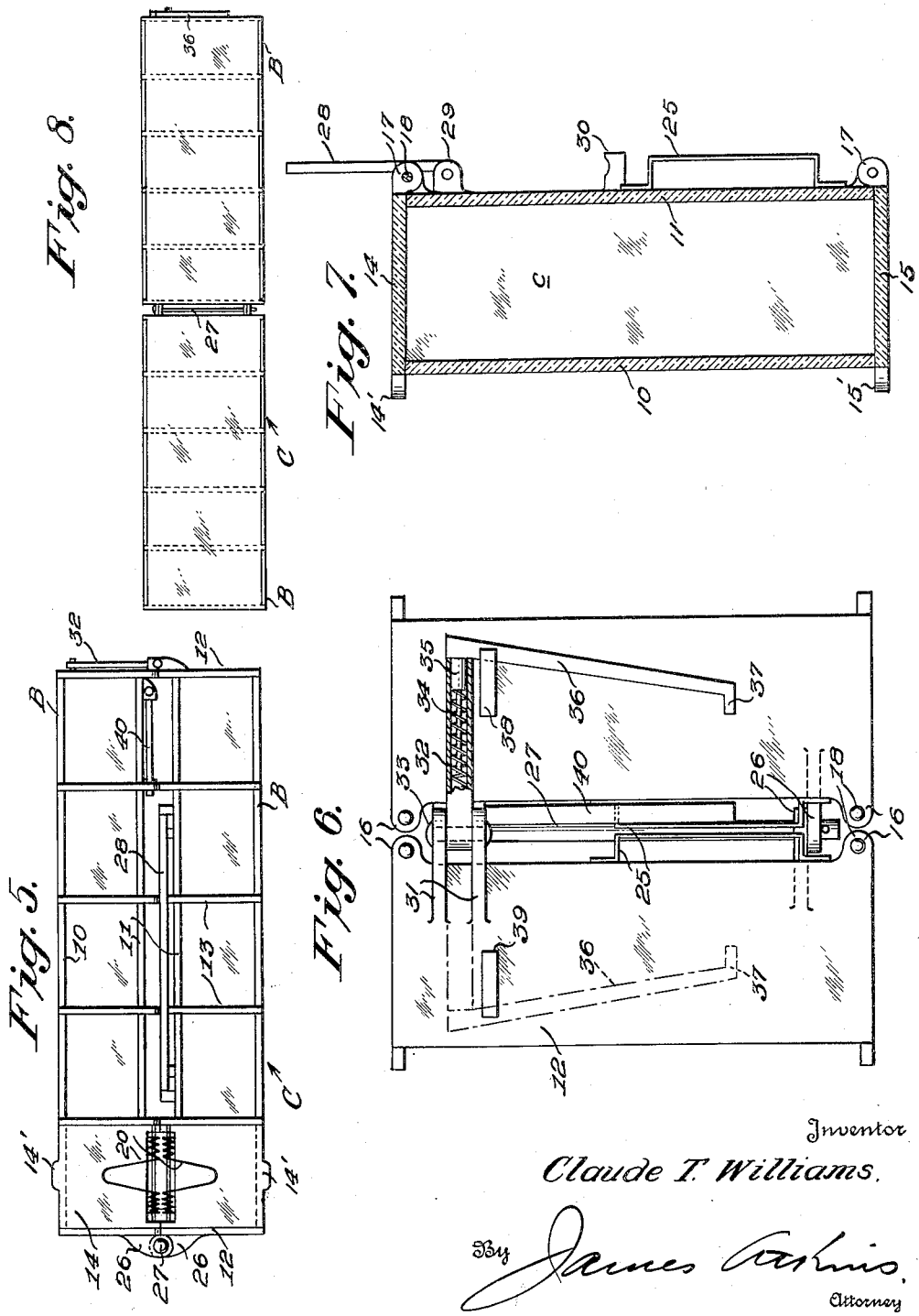
Inventor
Claude T. Williams,
By James Askins
Attorney Patented July 4, 1950

UNITED STATES PATENT OFFICE 2,513,538

CARRIER FOR BAIT-CASTING PLUGS AND LURES

Claude T. Williams, Knob Noster, Mo.

Application December 6, 1946, Serial No. 714,445

4 Claims. (Cl. 224—5)

This invention relates to a carrier for bait-casting plugs and lures.

A primary object of the invention is the provision of a plug or lure carrier wherein the plugs or lures are individually supported in separate compartments to prevent tangling thereof, and wherein the walls of the carrier providing the compartments are transparent for selection of any particular plug or lure prior to opening of the compartments.

A further object of the invention is the provision of a plug or lure carrier in the form of a box having a plurality of separate compartments for individual support of plugs or lures, and wherein the box is provided with means for supporting same from the belt of a user and separate means for supporting same from the rail of a boat.

A still further object of the invention is the provision of a carrier for plugs or lures comprising a pair of elongated boxes, each having a plurality of plug or lure-supporting compartments therein, and wherein the boxes have a detachable hinge connection at adjacent ends thereof whereby the two boxes may be disposed in alinement in the provision of a single relatively long carrier, or upon detachment of the hinge connection one or the other of the boxes may be used as a carrier.

A still further object of the invention is the provision of a plug or lure carrier of the above-noted character wherein the two hinged boxes are capable of being swung into lapped engagement, and wherein means is provided for detachably connecting the ends of the boxes opposed to those having the hinge connection.

A still further object of the invention is the provision of a carrier for plugs or lures which comprises a plug or lure-supporting compartment having transparent walls and means for supporting the compartment in vertical position, and wherein the compartment is provided with an upper plug-admission door and a lower plug-removing door.

These and other objects will appear from a consideration of the following description, taken in connection with the accompanying drawings, wherein:

Figure 1 is a rear elevational view of the improved carrier in accordance with a preferred embodiment thereof, the carrier being shown in fully extended position, with the door-closing springs omitted.

Figure 2 is an end elevational view as observed from the left of Fig. 1, with the spring clamp omitted, illustrating an application of the invention to a single-section carrier.

Fig. 3 is a fragmental rear elevation particularly illustrating the upper and lower door-closing springs for one of the compartments, and showing in dotted lines a lure in such compartment.

Fig. 4 is a bottom plan view of the structure shown in Fig. 3.

Fig. 5 is a top plan view of the carrier in folded position, with certain parts omitted for clarity of disclosure.

Fig. 6 is an end elevation as observed from the right of Fig. 5.

Fig. 7 is a sectional view substantially in the plane of line 7—7, Fig. 1.

Fig. 8 is a front elevation on a reduced scale showing the carrier in extended position.

Fig. 9 is a view of the carrier in end elevation, on a reduced scale, and particularly illustrating the application of the spring clamps in supporting the carrier from the rail or edge of a boat.

Referring now in detail to the drawings, C designates the carrier, as a whole, and which comprises a pair of boxes B.

Each box B comprises front and rear walls 10 and 11, end walls 12, and a plurality of partitions 13, which correspond with the end walls. The walls and partitions are preferably integral in the molding of the structure from transparent plastic material, although not being necessarily limited thereto.

The end walls and partitions project beyond the upper and lower edges of the front and rear walls a distance equal to the thickness of upper and lower doors 14 and 15, which are pivotally connected adjacent the rear wall.

The pivotal connection of the doors is preferably effected by the provision of lugs 16 integral with and projecting from the rear wall 11 in alinement with the end walls 12 and partitions 13. The doors 14 and 15 are provided with corresponding lugs 17, and a long pivot rod 18 extends through the lugs 16 and 17 from one end wall 12 to the other at both the upper and lower edges of the rear wall 11. The doors 14 and 15 are also preferably of transparent plastic material and such, together with the walls and partitions, provide vertically disposed separate compartments c for individually supporting plugs or lures L, as is indicated in Fig. 3.

The plugs or lures are adapted for insertion into the compartments c through the upper doors 14 and for withdrawal from the compartments through the lower doors 15. While the upper doors 14 may remain closed by gravity, it is necessary to provide means to maintain the lower doors 15 closed against gravity as well as the weight of the lures directly supported thereon, and such means are as follows, and which are also provided on the upper doors as a measure of protection in the event of overturning of the carrier.

A spring 20 is provided for each door 14, 15, and such spring comprises a U-shaped portion 21 bearing upon the outer face of the door, a pair of coils 22 surrounding rod 18, and the free extended ends 23 engage the rear wall 11 and may be suitably secured thereto.

The springs 20 exert sufficient tension to maintain the lower doors 15 closed, but yield upon slight pressure downward on the doors for removing the lures L.

To facilitate opening of the doors 14 and 15, they are preferably provided with lugs 14' and 15' projecting beyond the front wall 10.

Each box B is provided with a pair of loops 25 on the rear wall 11 thereof, through which a fisherman's belt may be threaded for carrying the box with him.

The two boxes B are adapted for detachable hinge connection at adjacent ends thereof, and such is preferably accomplished by the provision of cooperating apertured lugs 26 on corresponding end walls 12 adjacent the rear walls 11, as is more clearly indicated in Fig. 5, and such lugs receive a removable hinge pin 27. Thus, the boxes B are pivotally connected for swinging into alinement, as in Figs. 1 and 8, or for folding, as in Figs. 5 and 6. The boxes being thus folded particularly for transportation of the carrier and to facilitate carrying of the folded boxes, one thereof is provided with a handle 28 pivotally connected to lugs 29 on the rear wall 11, and such wall is provided with a yieldable catch 30 for retaining the handle in an inoperative position, as indicated in dotted lines in Fig. 1.

While the detachable hinge connection is illustrated as including a removable hinge pin, any other or desired form of readily detachable hinge connection may be employed within the scope of the present invention.

In order to maintain the ends of the boxes B opposite the hinged ends against inadvertent separation during transportation of the carrier, the end wall 12 of one of the boxes is provided with a pair of lugs 31 between which one end of a socket bar 32 is pivoted by pin 33 for horizontal swinging movement. A coil spring 34 is disposed within the socket bar with opposed ends thereof connected thereto and to a cylindrical shank 35 of a clamp bar 36, which is preferably provided with a terminal hook 37.

The end wall 12 of the other box B is provided with a latch lug 38 in which bar 36 is disposed under tension of the spring 34 when the adjacent ends of the boxes are yieldably locked in position, as shown in Fig. 6.

To maintain the bars 32, 36 in fixed position when the boxes are in their alined operative positions, the bar 32 is swung about pivot pin 33 into engagement with a latch lug 39 on the end wall 12, which is provided with the lugs 31, as is indicated in dotted lines in Fig. 6.

A spring clamp structure similar to that including the above described elements 31 to 37 is carried by the rear wall 11 of the other box B adjacent its free end, and includes a socket bar 40 pivoted to lugs 41 and a clamp bar 42, which is preferably provided with a terminal hook 43. The rear wall 11 is provided with a latch lug 44 for holding the clamp in its inoperative position, as shown in Fig. 1, and in which position it rests between the two boxes in their folded position.

This clamp structure, however, upon swinging the socket bar on its pivotal connection with lugs 41 to a position normal to the rear wall 11, cooperates with the first described clamp structure when in the position of Fig. 6, with bar 36 disengaged from lug 38 for supporting the carrier from the rail or edge of a boat b, as illustrated in Fig. 9, which shows the socket bar 32 resting on the upper edge of the boat and with the clamp bar 36 engaged with the outer wall thereof, the hook 37 functioning to prevent inadvertent removal of the carrier.

The spring clamp 40 to 43 functions in like manner at the other end of the extended carrier.

It will be appreciated from the foregoing disclosure that a plug or lure carrier is provided which substantially fully meets the requirements of structures of this kind. With the carrier distended, as in Figs. 1 and 8, ten plugs or lures may be carried separately in the compartments c, which may be of a size to meet the requirements for any particular size plug or lure. The lures may be readily placed in the compartments through the doors 14, and since the carrier is preferably constructed of transparent material the plugs or lures in the carrier are all visible, whereby a fisherman may readily ascertain any particular plug or lure which he may desire to use.

Having selected any particular plug or lure, the door 15 of the particular compartment holding such plug or lure is lowered against the action of spring 20, whereby the plug or lure falls out and may be caught in the hand.

The carrier may contain any desired number of compartments, and when distended it may be suspended from a boat b or the like, as in Fig. 9, or the hinge may be disconnected and one or the other of the boxes B carried by the belt of the fisherman.

The two boxes B may readily be folded for transportation and carried by means of the handle 28.

Furthermore, it is within the scope of the present invention to provide a carrier comprising one or more compartments c, in which case the handle and spring retaining clamps may be omitted, such carrier thus appearing in end elevation, as in Fig. 2.

While the invention has been disclosed as being wholly of transparent material, nevertheless it may be constructed otherwise with the front wall only being transparent whereby the plugs or lures may be readily visualized.

While I have disclosed my invention in accordance with a specific embodiment thereof, such is to be considered as illustrative only, and not restrictive, the scope of the invention being defined in the subjoined claims.

What I claim and desire to secure by U. S. Letters Patent is:

1. A lure carrier comprising an elongated box having a plurality of lure-receiving compartments provided by vertically disposed front, rear and end walls, a plurality of spaced partitions parallel with the end walls and extending from the front wall to the rear wall, an upper and a lower door for each compartment normally resting on the front and rear walls, the end walls and partitions extending above and below the front and rear walls a distance equal to the thickness of the doors and providing spacers therebetween, lugs projecting rearwardly of the rear wall in alinement with the end walls and partitions, cooperating lugs extending rearwardly of the doors, pivot connections between all of said lugs for swinging of said doors to and from closed position, yieldable means associated with the pivotal connections and doors for normally maintaining the doors closed, and finger-engaging lugs on the front ends of the doors in projecting relation to the front wall.

2. A lure carrier comprising a pair of elongated rectangular lure-supporting boxes, a detachable hinge connection between adjacent ends of the boxes for disposition of the boxes in alined position and for folding thereof into lapped relation, a spring-urged clamp pivotally supported by the end wall of one of the boxes opposed to the hinged end thereof, a spring-urged clamp pivotally supported by the rear wall of the other box adjacent its end oposite the hinged end thereof, said clamps being swingable to positions rearwardly of the boxes when in alined position for engagement with a boat rail, a lug on the first-named end of the second box, and the spring-urged clamp on the first-named box being swingable into engagement with said lug for holding the boxes in folded position.

3. A lure carrier according to claim 2, together with a lug on each of said end wall and said rear wall respectively engageable by said first and second spring-urged clamps for retaining same in position.

4. A lure carrier comprising a pair of elongated rectangular boxes each having front, rear and end walls, a detachable hinge connection between adjacent end walls of the boxes and adjacent the rear walls theerof for movement of the boxes to alined positions and for folding thereof with their rear walls in relatively close parallel relation, and a pair of belt-receiving straps on the rear wall of each of the boxes.

CLAUDE T. WILLIAMS.

REFERENCES CITED

The following references are of record in the file of this patent:

UNITED STATES PATENTS

| Number | Name | Date |
|---|---|---|
| 1,225,001 | Bartlett | May 8, 1917 |
| 1,382,419 | Fry | June 21, 1921 |
| 1,549,400 | Wimler | Aug. 11, 1925 |
| 1,745,769 | Schroedter | Feb. 4, 1930 |
| 1,747,003 | Hammer | Feb. 11, 1930 |
| 1,756,945 | Hammer | May 6, 1930 |
| 1,770,188 | Auth | July 8, 1930 |
| 1,959,963 | Overmyer | May 22, 1934 |